Patented Mar. 22, 1949

UNITED STATES PATENT OFFICE 2,464,902

PROCESS OF PREPARING A PHOSPHATE-IMPREGNATED ACID-TREATED ACTIVATED CHARCOAL

Kenneth Barton Stuart, Denver, Colo., assignor to The Colorado Fuel and Iron Corporation, a corporation of Colorado No Drawing. Application December 10, 1943, Serial No. 513,728

5 Claims. (Cl. 252—237)

This invention is concerned with activated carbon and contemplates novel activated carbon of improved properties, especially with regard to decolorizing. The invention also contemplates an improved process which is particularly applicable to the treatment of activated carbon derived from coal and related substances such as boney coal and mother of coal, although it may be employed in the treatment of a great variety of carbonaceous materials.

I have discovered that the deposition of a non-alkali metal phosphate within particles of activated carbon greatly increases the catalytic activity of the carbon with respect to both decomposition and synthesis reactions and particularly reactions involving hydration-dehydration phenomena. Thus I have developed a synthetic bone char comprising porous activated carbon having phosphate deposited on the carbon particle structure and preferably in the pores thereof. The phosphate should be that of a non-alkali metal, i. e., a phosphate of metals other than sodium and potassium. Alkaline earth metal phosphates such as the phosphates of barium, magnesium, and calcium are particularly suitable, calcium phosphate, and especially tri-calcium phosphate, being preferred.

For the practice of my invention, it is preferable to employ coal or activated carbon derived from coal that has a substantial calcium content, the calcium being present as ash in the char. However, the calcium may be derived from an outside source and I have obtained excellent results by precipitating calcium phosphate within activated carbon by introducing both calcium hydroxide and phosphoric acid into the carbon so that they react to form calcium phosphate.

It should be understood that the invention is not limited to the use of calcium phosphates or in fact to the use of alkaline earth metal phosphates, since improved results have also been obtained through the treatment of activated carbon to deposit therein aluminum phosphate, copper phosphate, iron phosphate, zinc phosphate, and manganese phosphate. Likewise, as noted above, barium phosphate and magnesium phosphate are excellent for the practice of the invention.

These and other features of my invention will be understood more thoroughly in the light of the following detailed description:

1. Carbon made by charring Colorado anthracite and containing a substantial proportion of calcium as lime ash was treated with a solution of phosphoric acid to form calcium phosphate within the carbon. This treatment greatly enhanced the decolorizing ability of the carbon, increasing it by 123%.

2. In a second test the same carbon as employed above was treated with a suspension of calcium hydroxide and a solution of phosphoric acid to precipitate calcium phosphate on the carbon surfaces within the particles. This treatment enhanced the decolorizing ability of the carbon by 66%.

3. In a third operation the same carbon was treated with a soluble calcium salt and a soluble alkali phosphate to precipitate calcium phosphate on the carbon surfaces and particularly within the particles with resulting increase in decolorizing ability of 163%.

4. Before treatment by each of the methods described in paragraphs 1, 2 and 3 the carbon was treated with an aqueous solution of chromic acid to oxidize carbonaceous material and thus increase the pore space of the carbon. This treatment was responsible for an increase in the decolorizing ability of the carbon produced as noted in paragraphs 1, 2 and 3 by as much as 5 to 10%.

5. Instead of increasing the pore space by oxidizing carbon, the char employed in the test described in paragraphs 1, 2 and 3 was first treated with hydrofluoric acid. This increased the pore space by removing ash constituents. After the constituents were leached out, the carbon was treated as described in paragraphs 1, 2 and 3. An increase in decolorizing ability of 10–20% could be attributed to the acid treatment. Other strong acids and in fact any suitable solvents for ash constituents in the carbon can be employed in place of the hydrofluoric acid. Likewise oxidizing agents other than chromic acid can be employed to increase the pore space by oxidizing carbon.

The following table gives a summary of improvements attributable to the treatment of activated carbon in several ways, all of which involve the deposition of calcium phosphate within the carbon, which initially had a calcium content in the form of ash.

Table

| Chemical Treatment | Percent Color Removal | Percent Improvement |
|---|---|---|
| None | 30.0 | |
| 0.5% $H_3PO_4$, $H_2O$ washed | 66.8 | 123 |
| 1% $CaCl_2$, con. $H_3PO_4$, $H_2O$ washed | 73.2 | 144 |
| 1% $Na_2HPO_4$, sat. $CaCl_2$, $H_2O$ washed | 76.8 | 156 |
| 10% $Na_2HPO_4$, sat. $CaCl$, $H_2O$ washed | 76.0 | 153 |
| 1% $CaCl_2$, sat. $Na_2HPO_4$, $H_2O$ washed | 78.8 | 163 |
| 1% $Na_2HPO_4$, sat. $Ca(CHO_2)_2$, $H_2O$ washed | 75.6 | 152 |
| Sat. $Ca(CHO_2)_2$, con. $H_3PO_4$ | 78.8 | 163 |
| 0.5 N, $H_2CrO_4$, 1% $CaCl_2$, 1.5% $Na_2HPO_4$ | 79.0 | 163 |
| 1% $H_2CrO_4$, $Ca(OH)_2$ 1%, $P_2O_5$, $Ca(OH)_2$ | 82.5 | 175 |
| 5% HF, 1% $CaCl_2$, 1.5% $Na_2HPO_4$ | 89.5 | 198 |
| 5% HF, 1% $P_2O_5$, $Ca(OH)_2$ | 83.6 | 177 |

The deposition of the phosphate in contact with the carbon may be accomplished at any convenient stage in the manufacturing operation. Thus the activated carbon or the char or the raw material may be treated. As indicated above I prefer to treat with the phosphate activated carbon derived from coal containing a substantial calcium content, the term coal being used to include boney coal and mother of coal, both of which are highly useful for the manufacture of phosphate-impregnated activated carbon, especially when the material has been treated with a strong mineral acid (say hydrofluoric acid) to remove ash constituents and thus increase pore space.

It will be apparent from the foregoing examples that the phosphate radical used to form the metal phosphate need not be present as phosphoric acid, since various soluble phosphates are suitable.

Generally speaking, the phosphates of the alkali metals do not enhance decolorizing ability. In fact, the presence of sodium phosphate in some instances has brought about an actual increase in color of solutions treated with the carbon.

As indicated above, it is desirable to increase the pore space of the carbon, either before or after the phosphate precipitation by means of oxidizing agents for the carbon or a solvent for the ash constituents or other calcium containing ingredients. Both the solvent and the oxidizing agents preferably are employed in liquid phase.

I claim:

1. In the production of activated carbon, the improvement which comprises treating carbonaceous material derived from coal having a substantial calcium ash content with an oxidizing acid to increase the pore space of the carbon therein, and depositing an inorganic non-alkali metal phosphate within the pore space of the carbon to increase its catalytic activity and adsorptive capacity.

2. Method according to claim 1, in which the phosphate is deposited in the pore spaces by treating the oxidized carbon with a suspension of calcium hydroxide and a solution of phosphoric acid.

3. Method according to claim 1, in which the phosphate is deposited in the pore spaces by treating the oxidized carbon with a water soluble calcium salt and a water soluble alkali phosphate.

4. Method according to claim 1, in which the phosphate is deposited in the pore spaces by treating an oxidized carbon containing a calcareous ash with a solution of phosphoric acid.

5. Method according to claim 1, in which the phosphate is an alkaline earth metal phosphate.

KENNETH BARTON STUART.

REFERENCES CITED

The following references are of record in the file of this patent:

UNITED STATES PATENTS

| Number | Name | Date |
|---|---|---|
| 1,286,187 | Mumford | Nov. 26, 1918 |
| 1,496,229 | Jones | June 3, 1924 |
| 1,539,775 | Sauer | May 26, 1925 |
| 1,689,647 | Urbain | Oct. 30, 1928 |
| 1,905,686 | Cole | Apr. 25, 1933 |
| 2,040,931 | Fuchs | May 19, 1936 |
| 2,170,601 | Wilson | Aug. 22, 1939 |
| 2,352,932 | Barret et al. | July 4, 1944 |

FOREIGN PATENTS

| Number | Country | Date |
|---|---|---|
| 132,572 | Great Britain | Sept. 15, 1919 |